(12) United States Patent
Wagle et al.

(10) Patent No.: US 10,526,521 B2
(45) Date of Patent: Jan. 7, 2020

(54) INVERT EMULSION DRILLING FLUIDS WITH FATTY ACID AND FATTY DIOL RHEOLOGY MODIFIERS

(71) Applicant: Saudi Arabian Oil Company, Dhahran (SA)

(72) Inventors: Vikrant Wagle, Abqaiq (SA); Abdullah Al-Yami, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 15/827,575

(22) Filed: Nov. 30, 2017

(65) Prior Publication Data
US 2018/0148626 A1 May 31, 2018

Related U.S. Application Data

(60) Provisional application No. 62/428,376, filed on Nov. 30, 2016.

(51) Int. Cl.
*C09K 8/36* (2006.01)
*C09K 8/03* (2006.01)
*C09K 8/035* (2006.01)
*E21B 43/16* (2006.01)

(52) U.S. Cl.
CPC ............ *C09K 8/36* (2013.01); *C09K 8/032* (2013.01); *C09K 8/035* (2013.01); *E21B 43/16* (2013.01)

(58) Field of Classification Search
CPC .......... C09K 8/36; C09K 8/032; C09K 8/035; E21B 43/16
See application file for complete search history.

(56) References Cited

U.S. PATENT DOCUMENTS

| | | |
|---|---|---|
| 5,461,028 A | 10/1995 | Mueller et al. |
| 7,514,496 B2 | 4/2009 | Amalric et al. |
| 8,236,735 B2 | 8/2012 | Maker et al. |
| 9,283,167 B2 | 3/2016 | Metten et al. |
| 9,376,608 B2 | 6/2016 | Wagle et al. |

(Continued)

FOREIGN PATENT DOCUMENTS

| | | |
|---|---|---|
| WO | 2016110322 A1 | 7/2016 |
| WO | 2016153866 A2 | 9/2016 |
| WO | 2016168177 A1 | 10/2016 |

OTHER PUBLICATIONS

Altenbach, et al., Synthesis and Characterization of Novel Surfactants: Combination Products of Fatty Acids, Hydroxycarboxylic Acids and Alcohols, Journal of Surfactants and Detergents, 2010, vol. 13, No. 4, p. 399.

(Continued)

*Primary Examiner* — Zakiya W Bates
*Assistant Examiner* — Crystal J Miller
(74) *Attorney, Agent, or Firm* — Bracewell LLP; Constance Gall Rhebergen

(57) ABSTRACT

Provided here are various invert emulsion drilling fluid compositions. The invert emulsion fluid is a water in oil emulsion, which can include an invert emulsifier to stabilize the water in oil emulsion, a 16 to 18 carbon carboxylic acid, a 36 carbon fatty dimer diol, a polymeric filter control agent, and an inorganic mineral including one or more of lime, calcium chloride, and barite. The invert emulsion drilling fluids can be formulated to be substantially free of clay.

14 Claims, 1 Drawing Sheet

(56) References Cited

U.S. PATENT DOCUMENTS

| | | | |
|---|---|---|---|
| 2004/0097380 A1* | 5/2004 | Summerhill | C09K 8/34 |
| | | | 507/100 |
| 2007/0055001 A1 | 3/2007 | Geurtsen et al. | |
| 2007/0219097 A1* | 9/2007 | Mueller | C09K 8/28 |
| | | | 507/110 |
| 2012/0202723 A1 | 8/2012 | Abbey et al. | |
| 2013/0020083 A1* | 1/2013 | Wagie | C09K 8/12 |
| | | | 166/285 |
| 2015/0299601 A1 | 10/2015 | Bennett et al. | |
| 2017/0342341 A1* | 11/2017 | Maker | C09K 8/035 |

OTHER PUBLICATIONS

PCT/US2017/063849 International Search Report and Written Opinion dated Jun. 13, 2019, 10 pgs.
GC2017-34336 Examination Report dated Apr. 13, 2019, 5 pgs.

* cited by examiner

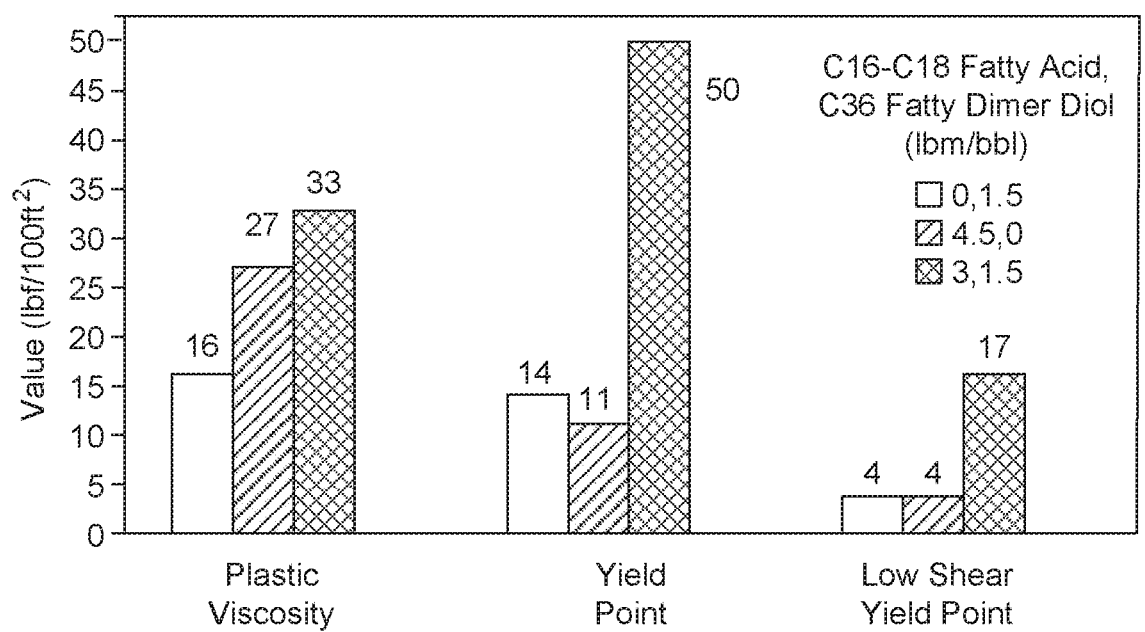

INVERT EMULSION DRILLING FLUIDS WITH FATTY ACID AND FATTY DIOL RHEOLOGY MODIFIERS

CROSS-REFERENCE TO RELATED APPLICATION

This application claims the benefit of and the priority to the U.S. Provisional Application No. 62/428,376 filed on Nov. 30, 2016.

FIELD

The disclosure relates to drilling fluids for oil and gas exploration. More specifically, the disclosure relates to the composition and use of invert emulsion fluids containing rheology modifiers.

BACKGROUND

A conventional invert emulsion fluid for drilling in oil and gas exploration generally includes clay in the formulation, where the clay acts as the primary rheology (viscosity) modifier. The clay can be organophilic clay or organoclay. Drilling fluids formulated with an organophilic clay can have a degradation of rheology properties over time. In other words, the organophilic clay formulated fluids can have a loss of viscosity over time, owing to the inability of the clay to maintain a necessary level of viscosity. One solution to the loss of viscosity with time is to add an excess amount of an organophilic clay to the drilling fluid or to add an excess of low gravity solids (LGS) to the drilling fluid, or both. However, adding excess clay or LGS can increase the cost of drilling and can severely impact other important drilling fluid properties, or both. These impacts on cost or fluid property, or both impacts can necessitate further costly treatments downhole or to the drilling fluid as remedies. For example, the addition of excess LGS can increase the plastic viscosity and the solids volume percentage, which can impact the rate of penetration of a drill bit into a formation, thus increasing the cost of drilling.

Drilling fluid rheology can change with increasing well depth as a result of changes in pressure and temperature. Such changes can cause changes in the equivalent circulating density (ECD) while drilling advances down through a formation. These fluctuations in ECD can lead to fracture of the formation when operating in a narrow window of pore pressure and fracture gradient. This can lead to formation damage and mud losses, thus increasing drilling costs. The use of thinner fluids to minimize rheology fluctuations, in general, can lead to lesser ECD; however, the fluid rheology may need to be such that the fluid properties enable cuttings removal and help to suspend drill solids. There are competing needs of greater viscosity for cuttings removal and suspension of solids versus lesser viscosity for better ECD.

SUMMARY

A need has been recognized for an invert emulsion drilling fluid with improved rheology and with stability of rheology during drilling to balance the needs of better ECD with cuttings removal and solids suspension. Certain embodiments relate to invert emulsion drilling fluid compositions and methods of drilling a wellbore using various invert emulsion drilling fluid compositions. In various embodiments, an invert emulsion drilling fluid can include a water in oil emulsion; an invert emulsifier to stabilize the water in oil emulsion in an amount operable to stabilize the water in oil emulsion; a fatty acid having at least eight carbons and at least one carboxylic acid group; a 36 carbon fatty dimer diol; a filtration control agent; and an inorganic mineral including one or more of lime, calcium chloride, and barite (barium sulfate, $BaSO_4$).

In various embodiments, the fatty acid can be a 36 carbon dimer diacid having the general formula illustrated by Formula 1.

Formula 1

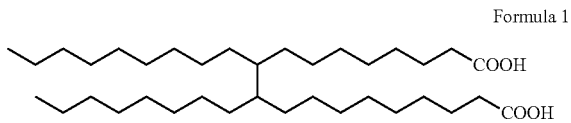 [SMILES: CCCCCCCCCC(CCCCCCCC(=O)O)C(CCCCCCCC)CCCCCCCCC(=O)O]

In various embodiments, the 36 carbon fatty dimer diol can have the general formula illustrated by Formula 2.

Formula 2

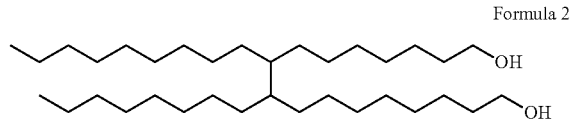 [SMILES: CCCCCCCCCC(CCCCCCCO)C(CCCCCCCC)CCCCCCCCO]

In various embodiments, the fatty acid can be a mixture of C16 and C18 saturated linear alpha carboxylic acids. An example of the C18 saturated linear alpha carboxylic acids is illustrated by Formula 3.

Formula 3

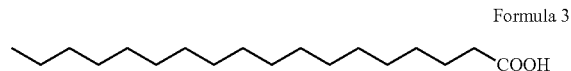 [SMILES: CCCCCCCCCCCCCCCCCC(=O)O]

In various embodiments, the fluid can be formulated to have an oil to water ratio from 5:95 to 95:5 by volume. In various embodiments, the fluid can be formulated to have a density of 63 to 164 $lbm/ft^3$ (pound mass per cubic foot). In various embodiments, the fluid can be formulated without clay and without LGS. In various embodiments, the fluid can be formulated to have a calcium chloride ($CaCl_2$) water phase salinity concentration of 200 to 390 thousand parts per million. In various embodiments, the fluid can be formulated to have 2 to 25 lbm/bbl (pound mass per barrel) of the invert emulsifier. In various embodiments, the fluid can be formulated to have 0.5 to 5 lbm/bbl of lime. In various embodiments, the fluid can be formulated to have at least 0.5 to 10 lbm/bbl of the fatty acid. In various embodiments, the fluid can be formulated to have 0.25 to 5 lbm/bbl of the filtration control agent. In various embodiments, the fluid can be formulated to have at least 0.5 lbm/bbl of the 36 carbon fatty dimer diol. In various embodiments, the oil can be selected from the group consisting of mineral oil, diesel fuel, and synthetic oil, and combinations thereof. In various embodiments, the fluid can be formulated to have a yield point greater than 15 $lbf/100\ ft^2$. In various embodiments, the fluid can be formulated to have a low shear yield point greater than 7 $lbf/100\ ft^2$.

In various embodiments, a method of drilling a wellbore with an invert emulsion fluid can include drilling in a formation using an invert emulsion fluid, wherein the fluid includes a water in oil emulsion; an invert emulsifier to stabilize the water in oil emulsion in an amount operable to stabilize the water in oil emulsion; a fatty acid having at least eight carbons and at least one carboxylic acid group; a 36 carbon fatty dimer diol; a filtration control agent; and an inorganic mineral including one or more of lime, calcium chloride, and barite. In various embodiments, the fatty acid can be a 36 carbon dimer diacid similar to Formula 1. In various embodiments, the 36 carbon fatty dimer diol can have the formula similar to Formula 2. In various embodiments, the fatty acid can be a mixture of C16 and C18 saturated linear alpha carboxylic acids. In various embodiments, the fluid can have an oil to water ratio from 5:95 to 95:5 by volume. In various embodiments, the fluid can have a density of 63 to 164 lbm/ft$^3$. In various embodiments, the fluid can have a calcium chloride water phase salinity concentration of 200 to 390 thousand parts per million. In various embodiments, the fluid can be formulated to have 2 to 25 lbm/bbl of the invert emulsifier. In various embodiments, the fluid can be formulated to have 0.5 to 5 lbm/bbl of lime. In various embodiments, the fluid can be formulated to have at least 0.5 to 10 lbm/bbl of the fatty acid. In various embodiments, the fluid can be formulated to have 0.25 to 5 lbm/bbl of the filtration control agent. In various embodiments, the fluid can be formulated to have at least 0.5 lbm/bbl of the 36 carbon fatty dimer diol. In various embodiments, the oil can be selected from the group consisting of mineral oil, diesel fuel, and synthetic oil, and combinations thereof. In various embodiments, the fluid can be formulated to have a yield point greater than 15 lbf/100 ft$^2$. In various embodiments, the fluid can be formulated to have a low shear yield point greater than 7 lbf/100 ft$^2$.

BRIEF DESCRIPTION OF THE DRAWINGS

Embodiments will be readily understood by the following detailed description in conjunction with the accompanying drawings. Embodiments are illustrated by way of example and not by way of limitation in accompanying drawings.

FIG. 1 is a graphical representation of the plastic viscosity (PV), the yield point (YP), and the low shear yield point (LSYP) data of the three fluids described in Table 1A, in accordance with various embodiments.

DETAILED DESCRIPTION

Embodiments of the present disclosure describe invert emulsion fluids (IEFs) for drilling in oil and gas exploration, where the fluids have a combination of fatty acid and fatty diol compounds for rheology modification. In some embodiments, the fluids can be formulations that are substantially free of clay. Further embodiments are described and disclosed here.

In the following description, numerous specific details are set forth in order to provide a thorough understanding of the various embodiments. In other instances, well-known processes and methods may not been described in particular detail in order not to unnecessarily obscure the embodiments described here. Additionally, illustrations of embodiments may omit certain features or details in order to not obscure the embodiments described here.

In the following detailed description, reference is made to the accompanying drawings that form a part hereof, wherein like numerals designate like parts throughout, and in which is shown by way of illustration embodiments in which the subject matter of the present disclosure can be practiced. Other embodiments can be utilized, and logical changes can be made without departing from the scope of the present disclosure. Therefore, the following detailed description is not to be taken in a limiting sense.

The description may use the phrases "in some embodiments," "in various embodiments," "in certain embodiment," or "in embodiments," which may each refer to one or more of the same or different embodiments. Furthermore, the terms "comprising," "including," "having," and the like, as used with respect to embodiments of the present disclosure, are synonymous.

As used here, when an invert emulsion fluid is "substantially free of" a component, the amount of that component present in the composition is such that it will not substantially impair the activity of the invert emulsion fluids and will confer advantages as described in a particular embodiment. For example, if an invert emulsion fluid is said to be substantially free of clay, then the concentration of clay in the invert emulsion fluid, as determined by a statistically significant quantitative evaluation, would be less than 5%. The term "approximately" as used here means within an acceptable error range for the particular value as determined by one of ordinary skill in the art, which will depend in part on how the value is measured or determined, i.e., the limitations of the measurement system.

Various embodiments disclosed here relate to formulations of invert emulsion fluids (IEFs) that are substantially free of organoclay and contain rheology modifiers, including a combination of a fatty acid and a fatty diol. An absence of organoclay as a primary viscosifier in an IEF can result in a fluid with lower plastic viscosity and with minimal impact on ECD while providing greater rates of penetration into a formation. An absence of organoclay in a fluid can provide a flatter rheology to the fluid, of which flatter rheology can be essential for drilling deep wells where the temperature gradient is large. An advantage of various embodiments disclosed here may be that a small concentration of both a fatty carboxylic acid and a fatty diol may provide greater low-end rheology as compared to when the fatty carboxylic acid or the fatty diol are used alone as rheology modifiers in an invert emulsion fluid. A further advantage of various embodiments disclosed here is that rheology modifier combinations disclosed here may provide good low-end rheology, thus resulting in reduced barite sag and good hole-cleaning capability. A further advantage of various embodiments disclosed here is that the effect of contamination on rheology of IEFs that are substantially free of organoclay may be minimal, and any effect of contamination may be easily treated by drilling fluid conditioners.

Without being bound by theory, the fatty acid and fatty diol may provide a synergistic effect that may provide enhanced low-end rheology properties to IEFs that are substantially free of organoclay, thus increasing hole-cleaning capacity and barite sag resistance of the fluid. This combination of rheology modifiers also can be used in conventional oil-based drilling fluids formulated with an organoclay. In various embodiments, examples of fatty acids can include C16-C18 fatty acids. In various embodiments, an example of a fatty diol can include a C32-C36 dimer fatty diol.

Selective rheological properties of an IEF can be predictive as to how the IEF can perform for drilling purposes. These properties can include plastic viscosity, yield point, and yield stress. For drilling purposes, PV can be indicative of drilling speed, where a lesser PV indicates an ability to drill faster. YP can be indicative of the cuttings carrying capacity of an IEF through an annulus (the hole cleaning ability of the IEF), where a greater YP implies a non-Newtonian fluid with better ability to carry away cuttings compared to a fluid of similar density but lesser YP; and yield stress can provide an indication of the susceptibility of an IEF to barite sag, where a greater yield stress value generally provides better resistance.

The YP and PV properties can be evaluated using the Bingham plastic (BP) rheology model. YP can be determined by extrapolating the BP model to a shear rate of zero and can represent the stress required to move the fluid. YP can be expressed in the units of lbf/100 ft$^2$. Generally, YP values greater than approximately 15 lbf/100 ft$^2$ are considered a suitable threshold for drilling purposes for providing suitable ability to carry away cuttings. PV can represent the viscosity of a fluid when extrapolated to infinite shear rate and can be expressed in units of centipoise (cP). PV indicates the type and concentration of the solids in an IEF, and a lesser PV generally is preferred for a formulation of an IEF as a lesser PV indicates a faster potential drilling rate. Both PV and YP can be calculated using 300 revolutions per minute (rpm) and 600 rpm shear rate readings on a standard oilfield viscometer and can be calculated by Equations 1 and 2 as shown below.

$$PV = 600 \text{ rpm reading} - 300 \text{ rpm reading} \quad \text{[Equation 1]}$$

$$YP = 300 \text{ rpm reading} - PV \quad \text{[Equation 2]}$$

Regarding yield stress, a value for yield stress can be indicated by the parameter $\tau_0$ (Tau-zero), which is a parameter from the Herschel Buckley (HB) rheology model. Generally, an IEF with a relatively large yield stress value can be expected to provide a better sag resistance, which is desirable for drilling purposes. The parameter $\tau_0$ can be determined by fitting the HB model to a shear stress versus shear rate curve, which can be the dial readings plotted against the corresponding rpm determined on a standard oilfield viscometer. $\tau_0$ can be expressed in similar units as YP. $\tau_0$ can be estimated within reasonable engineering tolerances by calculating a low shear yield point (LSYP) value using Equation 3.

$$LSYP = 2*(300 \text{ rpm reading}) - 600 \text{ rpm reading} \quad \text{[Equation 3]}$$

An LSYP value equal to or greater than approximately 7 lbf/100 ft$^2$ can be considered an acceptable threshold value for drilling purposes for minimizing barite sag.

The various embodiments disclosed here relate to an invert emulsion drilling fluid. In various embodiments, the fluid can be a water in oil emulsion, an invert emulsifier to stabilize the water in oil emulsion, a 16 to 18 carbon carboxylic acid including an 18 carbon carboxylic acid having the Formula 3, a 36 carbon fatty dimer diol having the Formula 2, a polymeric filter control agent; and an inorganic mineral including one or more of lime, calcium chloride, and barite.

In various embodiments, the fluid can be formulated with a ratio of oil to water of 5:95 to 95:5.

In various embodiments, the fluid can be substantially free of clay. In various embodiments, the IEFs are substantially free of organoclay. In various embodiments, the fluid can be substantially free of LGS.

In various embodiments, the 16 to 18 carbon carboxylic acid can include other fatty acids of lesser chain length, such as a C14 or C15, or greater chain length, such as a C19 or C20, or combinations of these fatty acids. In certain embodiments, a fatty acid having eight or more carbons can be used in formulations of the fluid.

In various embodiments, the fluid can be formulated to be approximately 90 lbm/ft$^3$. In various embodiments, the fluid can be formulated to have from 63 to 134 lbm/ft$^3$.

In various embodiments, the fluid can be formulated to have an oil to water ratio of approximately 5 to 95 to approximately 95 to 5.

In various embodiments, the fluid can be formulated to have a CaCl$_2$ water phase salinity concentration of approximately 250 thousand parts per million. In various embodiments, the fluid can be formulated to have a CaCl$_2$ water phase salinity concentration of approximately 100 to 390 thousand parts per million.

In various embodiments, the fluid can be formulated to have approximately 10 lbm/bbl of the invert emulsifier. In various embodiments, the fluid can be formulated to have approximately 5 to 25 lbm/bbl of the invert emulsifier. In various embodiments, the invert emulsifier can be LE SUPERMUL™ emulsifier (available from Halliburton Company, headquartered in Houston, Tex., USA). By way of example and not limitation, types of invert emulsifiers can include polyamides, sulfates, sulfonates, and carboxylates with hydrophile-lipophile balance value of less than 11. In various embodiments, the invert emulsifier can be any suitable invert emulsifier for formulating drilling fluids.

In various embodiments, the fluid can be formulated to have approximately 1.5 lbm/bbl of lime. In various embodiments, the fluid can be formulated to have approximately 0.5 to 5 lbm/bbl of lime.

In various embodiments, the fluid can be formulated to have at least approximately 0.25 lbm/bbl of the 16 to 18 carbon carboxylic acid. In various embodiments, the fluid can be formulated to have at least approximately 0.25 to 10 lbm/bbl of the 16 to 18 carbon carboxylic acid.

In various embodiments, the fluid can be formulated to have approximately 2 lbm/bbl of the polymeric filtration control agent. In various embodiments, the fluid can be formulated to have approximately 1-10 lbm/bbl of the polymeric filtration control agent. In various embodiments, the polymeric filtration control agent can be ADAPTA® filtration control agent. In various embodiments, the polymeric filtration control agent can be any suitable filtration control agent for formulating drilling fluids.

In various embodiments, the fluid can be formulated to have approximately 28-32 lbm/bbl of calcium chloride. In various embodiments, the fluid can be formulated to have approximately 83-87 lbm/bbl of water. In various embodiments, the amount of calcium chloride and water can vary outside these ranges and can be dependent upon the different additives in a fluid, oil/water ratio and the weight of the fluid.

In various embodiments, the fluid can be formulated to have at least approximately 0.25 lbm/bbl of the 36 carbon fatty dimer diol. In various embodiments, the fluid can be formulated to have at least approximately 0.25-10 lbm/bbl of the 36 carbon fatty dimer diol.

In various embodiments, the oil can be selected from the group consisting of mineral oil, diesel fuel, and synthetic oil, and combinations thereof.

In various embodiments, the fluid can be formulated to have approximately 220-225 lbm/bbl of barite. In various embodiments, the amount of barite can vary outside this range and can depend upon the oil to water ratio and the weight of the fluid.

In various embodiments, the fluid can be formulated to have a yield point greater than approximately 15 lbf/100 ft$^2$.

In various embodiments, the fluid can be formulated to have a low shear yield point greater than approximately 7 lbf/100 ft$^2$.

EXAMPLES

The present disclosure describes compositions for invert emulsion fluids (IEFs) with fatty acid and fatty diol rheology modifiers as illustrated and described here in the examples.

In various examples, selected IEFs that are substantially free of organoclay were formulated. The fluids were formulated to be 90 pounds per cubic foot (pcf) fluids with an oil to water ratio (OWR) of 70:30 and a $CaCl_2$ water phase salinity (WPS) concentration of 250 thousand parts per million (Kppm).

A C16-C18 fatty acid and a C36 fatty dimer diol were used as a rheology modifier combination to formulate various 90 pcf IEFs that were substantially free of organoclay. The C18 portion of the fatty acid has the chemical structure shown in Formula 1. The C16 portion of the fatty acid has two less carbons in the linear chain. The C36 fatty dimer diol has the chemical structure shown in Formula 2.

Table 1A provides formulation data for three IEFs with different amounts of C16-C18 fatty acid and Formula 2. The formulations are labeled as Fluids 1-3. For the formulation of Fluids 1-3, 146.6, 144.4, and 144.2 barrels of a mineral oil (available from Safra Company Limited, headquartered in Jeddah, Saudi Arabia) was added to a mixing cup, respectively. To the mineral oil an invert emulsifier (LE SUPERMUL™) was added in an amount of 10 pounds per barrel (ppb), followed by mixing for 5 minutes. Lime was added to this mixture in an amount of 1.5 ppb, followed by mixing for 5 minutes. Varying amounts of C16-C18 fatty acid were added to this mixture, followed by mixing for 5 minutes. The amounts of C16-C18 fatty acid, for Fluids 1-3 were 0, 4.5 ppb, and 3 ppb, respectively. A filtration control agent (ADAPTA® filtration control additive, available from Halliburton Company, headquartered in Houston, Tex., USA) was added to this mixture in an amount of 2 ppb, followed by mixing for 5 minutes. The filtration control agent is a cross-linked methylstyrene/acrylate copolymer and is to control fluid loss while minimizing impacts on plastic viscosity. $CaCl_2$) was added to this mixture in an amount of 29.5 pounds per barrel and water in an amount of 84.9 ppb followed by mixing for 5 minutes. Barite was added to this mixture in varying amounts of 229.6 ppb, 228.9 ppb, and 229 ppb to Fluids 1, 2, and 3, respectively, followed by mixing for 10 minutes. Varying amounts of Formula 2 were added to the mixture followed by mixing for 5 minutes. The amounts of Formula 2 added to Fluids 1, 2, and 3 were 1.5 ppb, 0, and 1.5 ppb, respectively. Each formulation was hot rolled (placed in a pressurized high temperature and pressure cell and rolled at 250° F. for 16 hours after all components were added to the formulation).

TABLE 1A

| Fluid formulation component in order of addition | Mixing Time after addition (min) | Fluid 1 | Fluid 2 | Fluid 3 |
|---|---|---|---|---|
| Safra oil (bbl) | — | 146.6 | 144.4 | 144.2 |
| Emulsifier (ppb) (LE SUPERMUL ™) | 5 | 10 | 10 | 10 |
| LIME (ppb) | 5 | 1.5 | 1.5 | 1.5 |
| Rheology Agent - C16-C18 fatty acid (ppb) | 5 | 0 | 4.5 | 3 |
| Filtration Control Agent (ppb) (ADAPTA ® filtration control additive) | 5 | 2 | 2 | 2 |
| $CaCl_2$ (ppb) | 5 | 29.5 | 29.5 | 29.5 |
| Water (ppb) | | 84.9 | 84.9 | 84.9 |

TABLE 1A-continued

| Fluid formulation component in order of addition | Mixing Time after addition (min) | Fluid 1 | Fluid 2 | Fluid 3 |
|---|---|---|---|---|
| Barite (ppb) | 10 | 229.6 | 228.9 | 229 |
| Rheology Agent - C36 fatty diol (ppb) | 5 | 1.5 | 0 | 1.5 |

Each of the three IEFs of Table 1A were tested in a standard oilfield viscometer at 3, 6, 100, 200, 300, and 600 rpm, and further were tested for gel strength (3 rpm test) and High Temperature High Pressure (HTHP) fluid loss. An example of a standard oilfield viscometer can include a FANN® Model 35 Viscometer, available from Fann Instrument Company, headquartered in Houston, Tex., USA. The rheology of the drilling fluid formulations was measured according to American Petroleum Institute (API) Recommended Practice 13B-2 (RP 13B-2), Section 6.3, Recommended Practice for Field Testing of Oil-based Drilling Fluids. A sample of each of drilling fluids was placed in a thermostatically controlled viscometer cup. An empty volume of approximately 100 cubic centimeter ($cm^3$) was left in the cup to account for the displacement of the fluid due to the viscometer bob and sleeve. Measurements were made with minimum delay from the time of preparation of the drilling fluid sample. Tests were carried out at either 50±1° C. (120±1° F.). The temperature of the sample was monitored and intermittent or constant shear at 600 rpm was used to stir the sample and obtain a uniform sample temperature. With the sleeve rotating at 600 rpm, the viscometer dial reading was allowed to reach a steady value. The time required to reach steady value depends on the characteristics of the drilling fluid sample. The dial reading of the viscometer at 600 rpm was recorded. The rotor speed was reduced to 300 rpm. The viscometer dial reading was allowed to reach a steady value and the dial reading at 300 rpm was recorded. The rotor speed was subsequently reduced to 200 rpm, 100 rpm, 6 rpm, and 3 rpm, and at each one of these rotational speeds, the viscometer dial reading was allowed to reach a steady value and the dial readings at 200 rpm, 100 rpm, 6 rpm, and 3 rpm were recorded. From the various measurements collected during this test, PV, YP, and LSYP were calculated for the three fluids and are shown in Table 1B.

The gel strength of the drilling fluids was also measured according to the API RP 13B-2, Section 6.3. A sample of each of drilling fluids was placed in the viscometer for testing as described previously. The drilling fluid was stirred at 600 rpm for ten seconds and the drilling fluid sample was allowed to stand undisturbed for ten seconds. The handwheel of the viscometer was turned slowly and steadily to produce a positive dial reading and the maximum reading thus obtained was recorded as the initial gel strength (10-second gel) in pound force per hundred square feet. The drilling fluid sample was restirred at 600 rpm for ten seconds and the drilling fluid sample was allowed to stand undisturbed for ten minutes. The measurements were repeated as described in this paragraph for the initial gel strength. The maximum reading now obtained was recorded as the ten-minute gel strength in pound force per hundred square feet. The gel strengths for the three drilling fluids are shown in Table 1B.

The HTHP fluid loss was measured according to the API RP 13B-2, Section 7.2. The HTHP fluid loss test measures static filtration behavior of drilling fluid at elevated temperatures, such as 250° F. This test was conducted using a HTHP filter press unit containing a filter cell, a pressurized gas source, a heating system, a high-pressure filtrate collection vessel (maintained at proper back-pressure), and a filter medium. The drilling fluid sample was stirred for five minutes using a field mixer and then poured into the filter cell, leaving at least 2.5 centimeters of space in the cell to allow for fluid expansion. The filter paper was installed in the cell and the filter cell was assembled with both top and bottom valves closed. The filter cell was placed inside the HTHP filter press unit with appropriate connections to the high-pressure filtrate collection vessel and the regulated pressurized gas source. The temperature of the drilling fluid sample inside the filter cell was maintained at the test temperature of 250° F. A pressure of about 100 pounds per square inch (psi) was maintained until the test temperature of 250° F. was reached. Then, the pressure of the drilling fluid sample inside the filter cell was increased to the test pressure of 500 psi and the timer for the filtration process was started. The filtrate was collected in the filtrate collection vessel for thirty minutes, and the volume of the filtrate was measured in milliliters (mL) using a graduated cylinder. The filtrate volume should be corrected to a filter area of 45.8 square centimeters ($cm^2$). HTHP filter cells usually have half the standard filter area or 22.58 $cm^2$, thus the observed volume is usually doubled and reported. The HTHP fluid loss measurements for the three drilling fluids are shown in Table 1B.

TABLE 1B

| Test | Fluid 1 | Fluid 2 | Fluid 3 |
|---|---|---|---|
| 600 rpm (cP) | 46 | 65 | 116 |
| 300 rpm (cP) | 30 | 38 | 83 |
| 200 rpm (cP) | 24 | 27 | 69 |
| 100 rpm (cP) | 17 | 18 | 53 |
| 6 rpm (cP) | 6 | 6 | 23 |
| 3 rpm (cP) | 5 | 5 | 20 |
| PV (cP) | 16 | 27 | 33 |
| YP (lbf/100 $ft^2$) | 14 | 11 | 50 |
| LSYP (lbf/100 $ft^2$) | 4 | 4 | 17 |
| Gel Strength - 10 sec (lbf/100 $ft^2$) | 5 | 5 | 19 |
| Gel Strength - 10 min, (lbf/100 $ft^2$) | 7 | 6 | 22 |
| HTHP fluid loss - 250 F., 500 psi, 30 min (mL) | 6 | 6 | 2.8 |

FIG. 1 graphically illustrates PV, YP, and LSYP data of the three fluids of Table 1A, in accordance with various embodiments. As seen in Table 1B and in FIG. 1, the YP values for Fluid 1 and 2 are lesser than the YP value for Fluid 3 (14 and 11 versus 50). Additionally, the LSYP values for Fluid 1 and Fluid 2 are well below the threshold of 7 lbf/100 $ft^2$ (4 lbf/100 $ft^2$ and 4 lbf/100 $ft^2$) in contrast to the value of 17 lbf/100 $ft^2$ for Fluid 3. As Fluid 1 contains Formula 2 (C36 fatty diol at 1.5 ppb) but no 16 to 18 carbon carboxylic acid and Fluid 2 contains C16-C18 fatty acid but no Formula 2 (C36 fatty diol), neither 16 to 18 carbon carboxylic acid nor Formula 2 used alone as rheology modifiers are adequate for the formulations of Fluids 1 and 2. In contrast, when both 16 to 18 carbon carboxylic acid and Formula 2 are added to a formulation as shown for Fluid 3, there is a synergistic and large impact upon YP and LSYP. YP jumps from values of 11 lbf/100 $ft^2$ and 14 lbf/100 $ft^2$ to a value of 50 lbf/100 $ft^2$. LSYP jumps from value of 4 lbf/100 $ft^2$ to value of 17 lbf/100 $ft^2$. These results are disproportionate to the dosages as the dosage of 16 to 18 carbon carboxylic acid for Fluid 3 is less than Fluid 2 and the dosage of Formula 2 for Fluid 3 is the same as for Fluid 1. Accordingly, 16 to 18 carbon carboxylic acid combined with Formula 2 improves fluid rheology disproportionately and unexpectedly for drilling fluid purposes, indicating a synergism between the two rheology modifiers.

Ranges may be expressed herein as from about one particular value and to about another particular value. When such a range is expressed, it is to be understood that another embodiment is from the one particular value and/or to the other particular value, along with all combinations within said range. Where the range of values is described or referenced herein, the interval encompasses each intervening value between the upper limit and the lower limit as well as the upper limit and the lower limit and includes smaller ranges of the interval subject to any specific exclusion provided.

Where a method comprising two or more defined steps is recited or referenced herein, the defined steps can be carried out in any order or simultaneously except where the context excludes that possibility.

While various embodiments have been described in detail for the purpose of illustration, they are not to be construed as limiting, but are intended to cover all the changes and modifications within the spirit and scope thereof.

What is claimed is:

1. A method of drilling a wellbore with an invert emulsion fluid, comprising:
    drilling in a formation using an invert emulsion fluid, wherein the fluid includes
        a water in oil emulsion;
        an invert emulsifier to stabilize the water in oil emulsion in an amount operable to stabilize the water in oil emulsion;
        a fatty acid having at least eight carbons and at least one carboxylic acid group, wherein the fatty acid is 36 carbon dimer diacid or a mixture of C16 and C18 saturated linear alpha carboxylic acids;
        a 36 carbon fatty dimer diol;
        a filtration control agent; and
        an inorganic mineral including one or more of lime, calcium chloride, and barite.

2. The method of claim 1, wherein the fatty acid is a 36 carbon dimer diacid having the formula

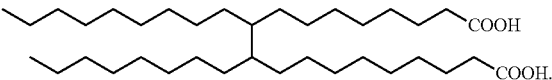 [SMILES: CCCCCCCCCC(CCCCCCCC(=O)O)C(CCCCCCCC)CCCCCCCCC(=O)O]

3. The method of claim 1, wherein the 36 carbon fatty dimer diol has the formula

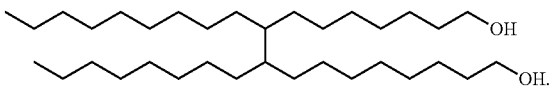 [SMILES: CCCCCCCCCC(CCCCCCCO)C(CCCCCCCC)CCCCCCCCO]

4. The method of claim 1, wherein the fluid has an oil to water ratio from 5:95 to 95:5 by volume.

5. The method of claim 1, wherein the fluid has a density ranging from 63 to 164 lbm/$ft^3$.

6. The method of claim 1, wherein the fluid has a calcium chloride ($CaCl_2$)) water phase salinity concentration of 200 to 390 thousand parts per million.

7. The method of claim 1, wherein the fluid has the invert emulsifier in an amount of 2 to 25 lbm/bbl.

8. The method of claim 1, wherein the fluid has the lime in an amount of 0.5 to 5 lbm/bbl.

9. The method of claim 1, wherein the fluid has the fatty acid in an amount of 0.5 to 10 lbm/bbl.

10. The method of claim 1, wherein the fluid has the filtration control agent in an amount of 0.25 to 5 lbm/bbl.

11. The method of claim 1, wherein the fluid has the 36 carbon fatty dimer diol in an amount of at least 0.5 lbm/bbl.

12. The method of claim 1, wherein the oil is selected from the group consisting of mineral oil, diesel fuel, and synthetic oil, and combinations thereof.

13. The method of claim 1, wherein the fluid has a yield point greater than 15 lbf/100 ft$^2$.

14. The method of claim 1, wherein the fluid has a low shear yield point greater than 7 lbf/100 ft$^2$.

* * * * *